(12) United States Patent
Lane

(10) Patent No.: US 7,255,313 B2
(45) Date of Patent: Aug. 14, 2007

(54) BRACKET ASSEMBLY TO SUSPEND OBJECTS

(76) Inventor: Terry Lane, 18335 Collins Ave., Apt. 112, North Miami Beach, FL (US) 33160

( * ) Notice: Subject to any disclaimer, the term of this patent is extended or adjusted under 35 U.S.C. 154(b) by 173 days.

(21) Appl. No.: 11/118,499

(22) Filed: May 2, 2005

(65) Prior Publication Data

US 2006/0243880 A1  Nov. 2, 2006

(51) Int. Cl.
- *A47B 96/00* (2006.01)
- *A47K 1/00* (2006.01)
- *A47K 5/00* (2006.01)
- *E04G 5/06* (2006.01)
- *F16L 3/08* (2006.01)
- *F21V 21/00* (2006.01)
- *F21V 35/00* (2006.01)

(52) U.S. Cl. ............... 248/222.41; 248/205.3; 248/339; 248/225.11; 248/683; 211/113; 211/85.29; 211/85.28; 211/66

(58) Field of Classification Search ............. 248/205.3, 248/339, 222.41, 225.11, 683; 211/113, 211/85.29, 85.28, 66
See application file for complete search history.

(56) References Cited

U.S. PATENT DOCUMENTS

| | | | | |
|---|---|---|---|---|
| 3,175,243 A | * | 3/1965 | Weber | 16/87.4 R |
| 3,190,500 A | * | 6/1965 | Miles | 222/105 |
| 3,480,245 A | * | 11/1969 | Gingher | 248/317 |
| 3,495,797 A | * | 2/1970 | Ganz | 248/339 |
| 4,067,532 A | * | 1/1978 | Viteretto | 248/683 |
| 4,300,692 A | * | 11/1981 | Moreno | 211/87.01 |
| 4,671,480 A | * | 6/1987 | Frye | 248/205.3 |
| 4,756,498 A | * | 7/1988 | Frye | 248/205.3 |
| 5,026,016 A | * | 6/1991 | Lisowski | 248/314 |
| 5,163,566 A | * | 11/1992 | Hempel | 211/65 |
| 5,259,519 A | * | 11/1993 | Lieberman | 211/66 |
| 5,484,066 A | * | 1/1996 | Luisi | 211/69.8 |
| 5,893,543 A | * | 4/1999 | Emery et al. | 248/205.5 |
| 5,957,421 A | * | 9/1999 | Barbour | 248/220.21 |
| 6,059,156 A | * | 5/2000 | Lehtinen | 224/197 |
| 6,877,619 B1 | * | 4/2005 | Han | 211/65 |

FOREIGN PATENT DOCUMENTS

| GB | 2214969 A | * | 9/1989 |
|---|---|---|---|
| GB | 2230556 A | * | 10/1990 |

\* cited by examiner

*Primary Examiner*—Carl D. Friedman
*Assistant Examiner*—Michael McDuffie
(74) *Attorney, Agent, or Firm*—Albert Bordas

(57) ABSTRACT

A bracket assembly to suspend objects, having a bracket and a suspending tab assembly for organizing objects in a suspended manner. The bracket comprises a rear and front wall joined at a top edge and a bottom edge. An interior seam defines the interior area where the rear wall and the front wall join. The front wall comprises at least one aperture having a longitudinal channel defined by edges. The suspending tab assembly comprises a generally elongated torso having a first tab at its distal end. The first tab is shaped to snugly fit within the at least one aperture. Opposite the first tab, the torso has a second tab. The second tab has adhesive means. A peel-off sticker initially covers the second tab to prevent unwanted matter from sticking to the adhesive means. The rear face of the rear wall also has adhesive means and also has a peel-off sticker.

3 Claims, 4 Drawing Sheets

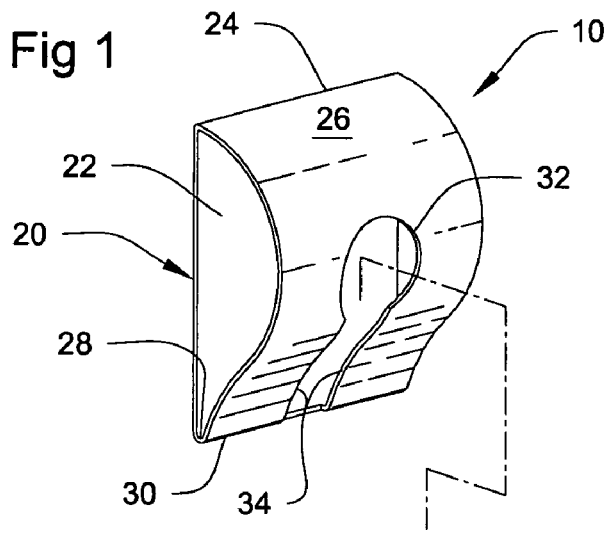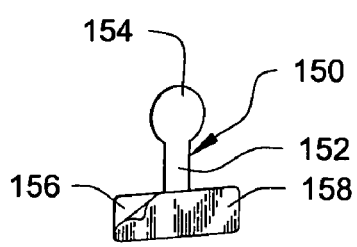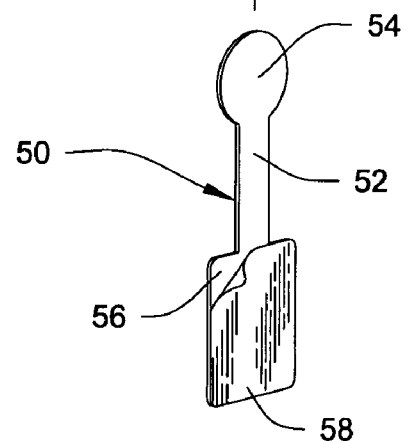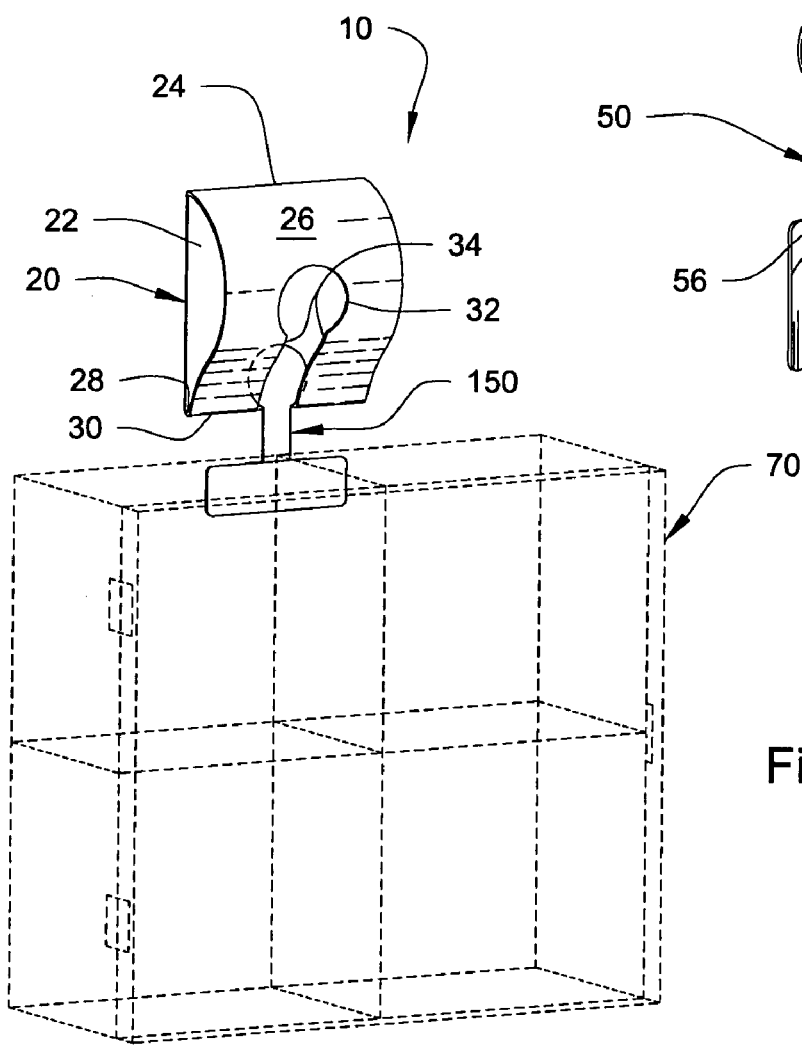

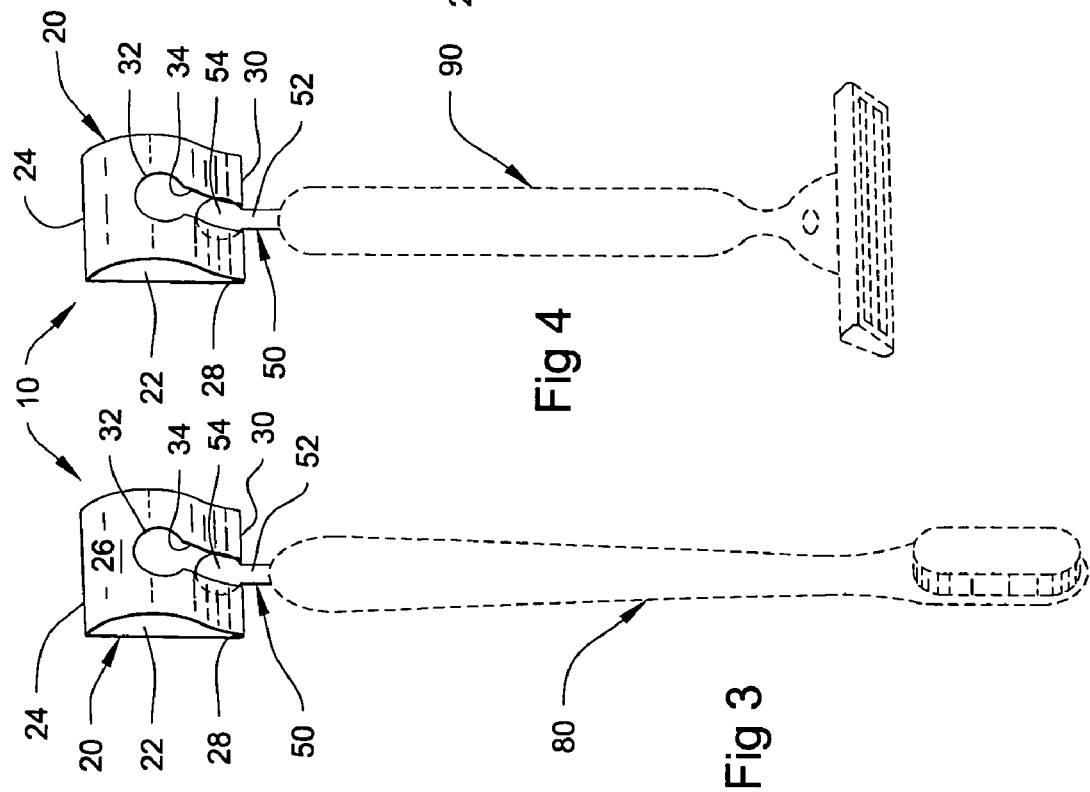

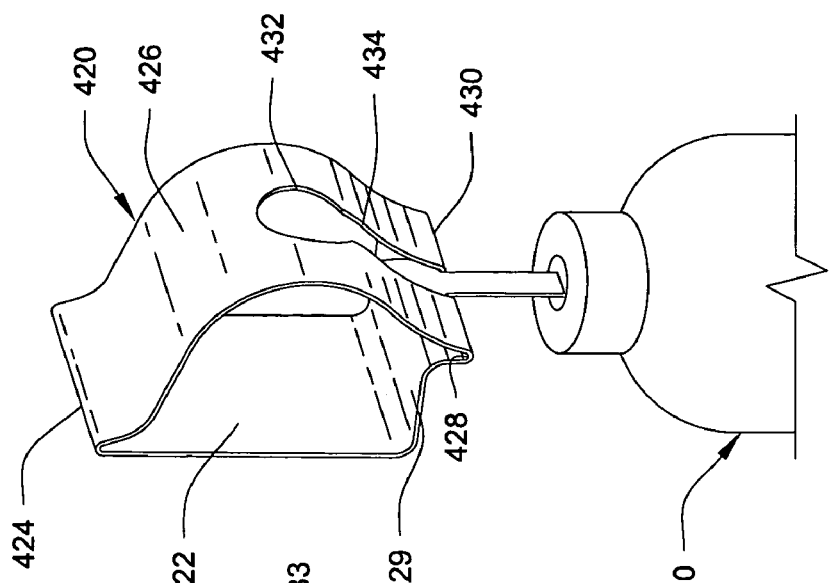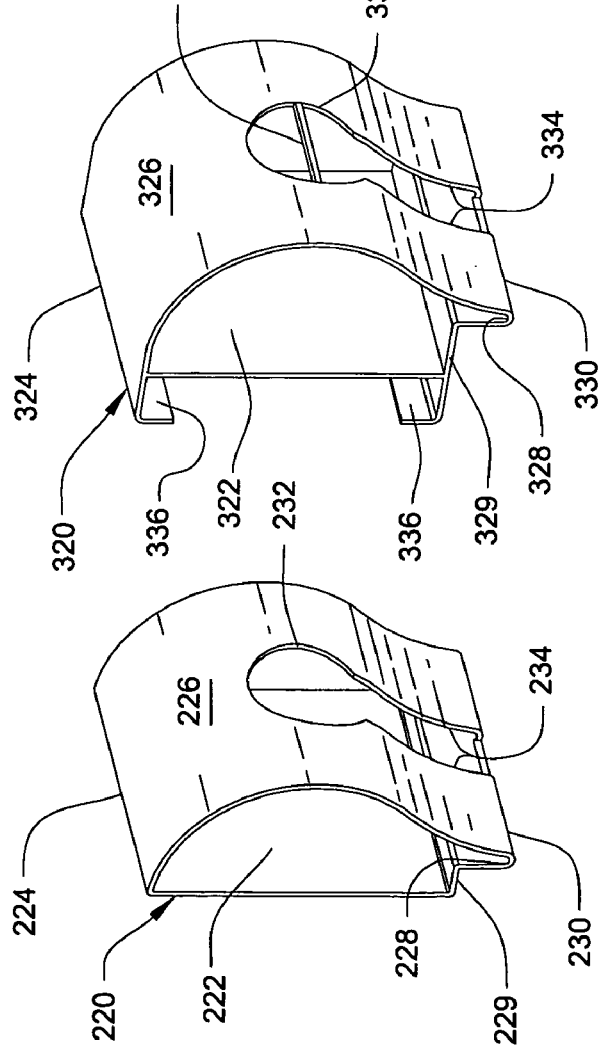

BRACKET ASSEMBLY TO SUSPEND OBJECTS

BACKGROUND OF THE INVENTION

1. Field of the Invention

The present invention relates to brackets, and more particularly, to bracket assemblies to organize objects in a suspended manner.

2. Description of the Related Art

Several designs for brackets have been designed in the past. None of them, however, includes a bracket and suspending tab assembly. There are no similar bracket assemblies to suspend objects to the best of applicant's knowledge, that have a bracket and a suspending tab assembly for organizing objects in a suspended manner.

SUMMARY OF THE INVENTION

A bracket assembly to suspend objects, comprising a bracket comprising a rear wall and a curved front wall joined at a top edge and a bottom edge. An interior seam defines an interior area where the rear wall and the curved front wall join. The curved front wall comprises at least one aperture having a longitudinal channel defined by edges. The rear wall has adhesive means and a first removable cover to prevent unwanted matter from sticking to the adhesive means of the rear wall. The bracket is mounted onto a surface with the adhesive means of the rear wall.

A suspending tab assembly comprises a generally elongated torso having a first tab at a first distal end. The first tab is shaped to snugly fit within the at least one aperture. The torso has a second tab at a second distal end. The second tab has adhesive means. The second tab further comprises a second removable cover to prevent unwanted matter from sticking to the adhesive means of the second tab. The second tab is secured onto an object to be suspended.

Suspending means are used to suspend the suspending tab assembly from the bracket. The suspending means comprise aligning and passing the first tab through the at least one aperture and allowing the first tab to rest upon the interior seam.

The surface is a wall structure, furniture panels, or inside kitchen cabinet doors. The torso is only slightly narrower than the longitudinal channel. The bracket further comprises a ledge extending perpendicularly from the rear wall a predetermined distance and then meets the interior seam. The ledge creates a clearance of approximately the predetermined distance between the rear wall and the interior seam to allow for the objects to be suspended while not making contact with the surface of which the bracket is mounted to. The aperture comprises a strip seal to indicate when the aperture has been used with the suspending tab assembly.

It is therefore one of the main objects of the present invention to provide bracket assemblies that have a bracket and a suspending tab assembly for organizing objects in a suspended manner.

It is another object of this invention to provide such a device that is inexpensive to manufacture and maintain while retaining its effectiveness.

Further objects of the invention will be brought out in the following part of the specification, wherein detailed description is for the purpose of fully disclosing the invention without placing limitations thereon.

BRIEF DESCRIPTION OF THE DRAWINGS

With the above and other related objects in view, the invention consists in the details of construction and combination of parts as will be more fully understood from the following description, when read in conjunction with the accompanying drawings in which:

FIG. 1 represents a perspective view of the present invention.

FIG. 2 shows an isometric view of the instant invention suspending a box for organizing objects in a suspended manner.

FIG. 2A illustrates a perspective view of the first alternate embodiment of the suspending tab assembly.

FIG. 3 illustrates an isometric view of the instant invention suspending a toothbrush.

FIG. 4 illustrates an isometric view of the instant invention suspending a razor.

FIG. 5A illustrates a perspective view of the preferred embodiment of the bracket.

FIG. 5B illustrates a perspective view of the first alternate embodiment of the bracket.

FIG. 5C illustrates a perspective view of the second alternate embodiment of the bracket.

FIG. 5D illustrates a perspective view of the third alternate embodiment of the bracket.

FIG. 5E illustrates a perspective view of the fourth alternate embodiment of the bracket suspending a bottle.

V. DETAILED DESCRIPTION OF THE PREFERRED EMBODIMENT

Figure 6:
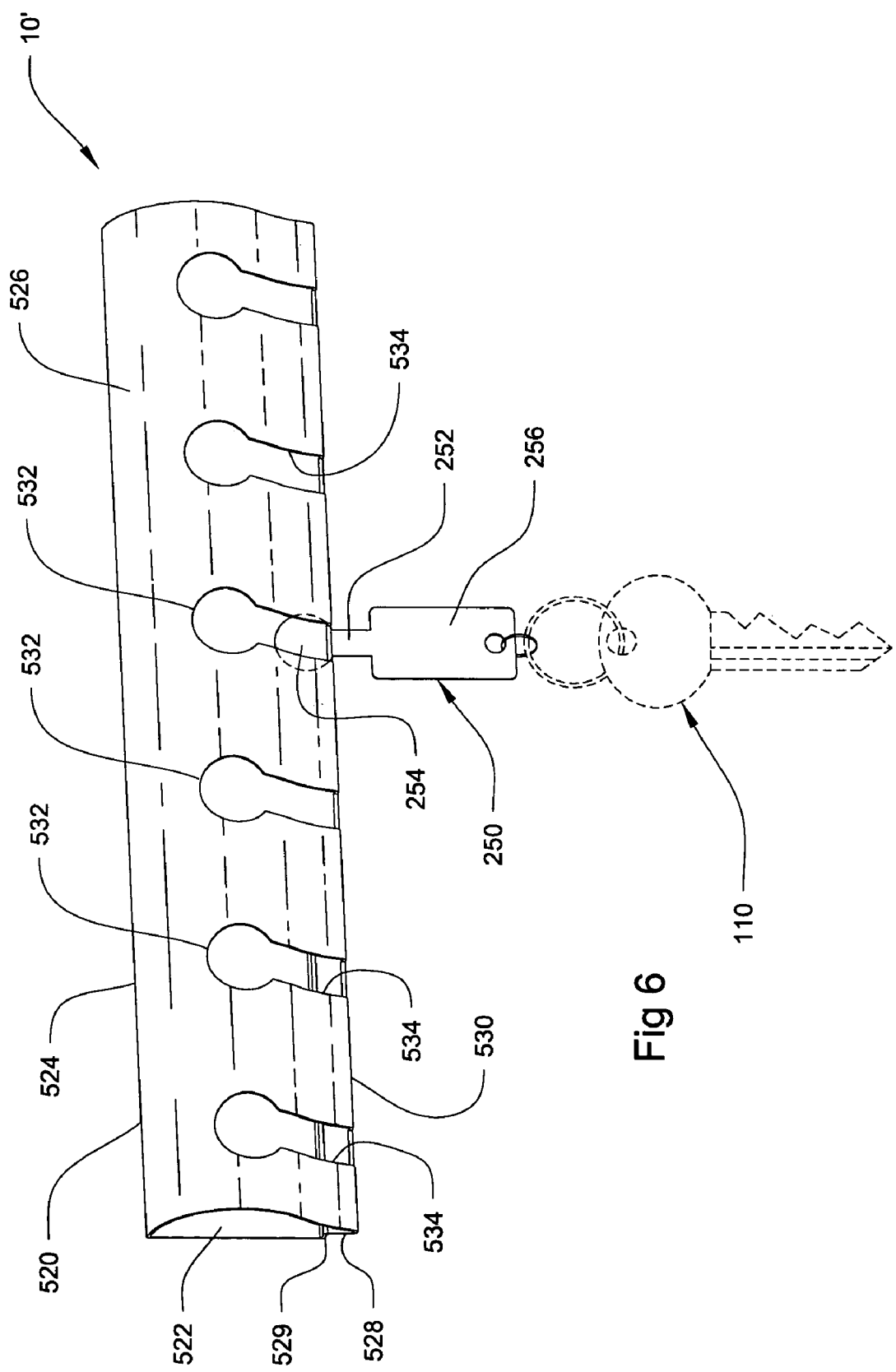
FIG. 6 represents a perspective view of another embodiment of the present invention.

Referring now to the drawings, where the present invention is generally referred to with numeral 10, it can be observed that it basically includes bracket 20 and suspending tab assembly 50.

As seen in FIG. 1, bracket 20 comprises generally flat rear wall 22 and generally outwardly curved front wall 26 joined at top edge 24 and bottom edge 30. Interior seam 28 defines an interior area where rear wall 22 and front wall 26 join. Front wall 26 comprises aperture 32 having a longitudinal channel defined by edges 34. Suspending tab assembly 50 comprises a generally elongated torso 52 having a tab 54 at its distal end. Tab 54 is shaped to snugly fit within aperture 32. Opposite tab 54, torso 52 has tab 56. Tab 56 has adhesive means. Peel-off sticker 58 initially covers tab 56 to prevent unwanted matter from sticking to the adhesive means of tab 56. Although not seen, it is noted that the rear face of rear wall 22 also has adhesive means and also has a peel-off sticker, such as peel-off sticker 58 to prevent unwanted matter from sticking to the adhesive means of the rear face of rear wall 22.

To use instant invention 10, a user removes the peel-off sticker from the rear face of rear wall 22 and mounts bracket 20 onto a surface for organizing objects in a suspended manner. In the preferred embodiment, such a surface is a wall structure. Other surfaces may include furniture panels, inside kitchen cabinet doors, and others that allow for organizing objects in a suspended manner. Then the user removes peel-off sticker 58 from tab 56. The user then joins tab 56 and the object to be suspended. Once joined, the user then aligns and passes tab 54 through aperture 32 and allows tab 54 to rest upon interior seam 28 to be suspended. It is noted that torso 52 is only slightly narrower than the longitudinal channel defined by edges 34. This ensures that suspending tab assembly 50 will remain suspended and not fall from bracket 20. The user may utilize the suspended object when desired and then return it to bracket 20.

As seen in FIG. 2, bracket 20 is suspending box 70 with the first alternate embodiment of the suspending tab assembly, defined as 150. Box 70 may be a pillbox.

As seen in FIG. 2A, suspending tab assembly 150 comprises a generally elongated torso 152 having a tab 154 at its distal end. Tab 154 is shaped to snugly fit within aperture 32. Opposite tab 154, torso 152 has tab 156. Tab 156 has adhesive means. Peel-off sticker 158 initially covers tab 156 to prevent unwanted matter from sticking to the adhesive means of tab 156. It is noted that tab 156 may be of various shapes and sizes to securely suspend objects of various weights such as box 70.

As seen in FIGS. 3 and 4, bracket 20 is suspending toothbrush 80 and razor 90 respectively. It is noted that the handles of toothbrush 80 and razor 90 may be manufactured to include a suspending tab assembly 50, regardless of the material they are made of.

Seen in FIG. 5A is the preferred embodiment of bracket 20.

Seen in FIG. 5B is the first alternate embodiment of bracket 20, defined as bracket 120. Bracket 120 comprises generally flat rear wall 122 and generally outwardly curved front wall 126 joined at top edge 124 and bottom edge 130. Interior seam 128 defines the interior area where rear wall 122 and front wall 126 join. Front wall 126 comprises aperture 132 having a longitudinal channel defined by edges 134. Bracket 120 also comprises ledge 129 that creates a clearance of a first predetermined distance between rear wall 122 and interior seam 128. The clearance allows for objects of greater width and/or depth to be suspended while not making contact with the surface of which bracket 120 is secured to.

Seen in FIG. 5C is the second alternate embodiment of bracket 20, defined as bracket 220. Bracket 220 comprises generally flat rear wall 222 and generally outwardly curved front wall 226 joined at top edge 224 and bottom edge 230. Interior seam 228 defines the interior area where rear wall 222 and front wall 226 join. Front wall 226 comprises aperture 232 having a longitudinal channel defined by edges 234. Bracket 220 also comprises ledge 229 that creates a clearance of a second predetermined distance between rear wall 222 and interior seam 228. The clearance allows for objects of greater width and/or depth to be suspended while not making contact with the surface of which bracket 220 is secured to.

Seen in FIG. 5D is the third alternate embodiment of bracket 20, defined as bracket 320, which may be disposable. Bracket 320 comprises generally flat rear wall 322 and generally outwardly curved front wall 326 joined at top edge 324 and bottom edge 330. Interior seam 328 defines the interior area where rear wall 322 and front wall 326 join. Front wall 326 comprises aperture 332 having a longitudinal channel defined by edges 334. Bracket 320 also comprises ledge 329 that creates a clearance of a third predetermined distance between rear wall 322 and interior seam 328. The clearance allows for objects of greater width and/or depth to be suspended while not making contact with the surface of which bracket 320 is secured to. In addition, this embodiment also comprises clip edges 336 that may be used to secure this embodiment to a track assembly, not seen. Such a track assembly may be secured onto the surface for organizing objects in a suspended manner defined above and may support a plurality of brackets 320 along side each other. Furthermore, aperture 332 comprises strip seal 333.

Strip seal 333 is designed to indicate when aperture 332 has been used with a suspending tab assembly 50. This embodiment may be disposable and used in a hospital setting for example.

Seen in FIG. 5E is the fourth alternate embodiment of bracket 20, defined as bracket 420. Bracket 420 comprises generally flat rear wall 422 and generally outwardly curved front wall 426 joined at top edge 424 and bottom edge 430. Interior seam 428 defines the interior area where rear wall 422 and front wall 426 join. Front wall 426 comprises aperture 432 having a longitudinal channel defined by edges 434. Bracket 420 also comprises ledge 429 that creates a clearance of a fourth predetermined distance between rear wall 422 and interior seam 428. The clearance allows for objects of greater width and/or depth to be suspended while not making contact with the surface of which bracket 420 is secured to. In this illustration, bracket 420 is suspending bottle 100. Bottle 100 may contain matter such as, but not limited to, shampoo, rinse, and gel.

Seen in FIG. 6 is another embodiment of the present invention, defined as 10'. In this embodiment, bracket 520 comprises generally flat rear wall 522 and generally outwardly curved front wall 526 joined at top edge 524 and bottom edge 530. Interior seam 528 defines the interior area where rear wall 522 and front wall 526 join. Front wall 526 comprises apertures 532, each having a longitudinal channel defined by edges 534. Suspending tab assembly 250 comprises a generally elongated torso 252 having a tab 254 at its distal end. Tab 254 is shaped to snugly fit within apertures 532. Opposite tab 254, torso 252 has tab 256. Although not seen, it is noted that the rear face of rear wall 522 also has adhesive means and also has a peel-off sticker to prevent unwanted matter from sticking to the adhesive means of rear face of rear wall 522. As illustrated, tab 256 may comprise a through hole for a key ring such as for key 110. Bracket 520 may also comprise ledge 529 that creates a clearance between rear wall 522 and interior seam 528. The clearance allows for objects of greater width and/or depth to be suspended while not making contact with the surface of which bracket 520 is secured to.

Instant invention 10 is made of an inexpensive lightweight material.

The foregoing description conveys the best understanding of the objectives and advantages of the present invention. Different embodiments may be made of the inventive concept of this invention. It is to be understood that all matter disclosed herein is to be interpreted merely as illustrative, and not in a limiting sense.

What is claimed is:

1. A bracket assembly to suspend objects, comprising:
A) a bracket comprising a rear wall and a curved front wall joined at a top edge and a bottom edge, an interior seam defines an interior area where said rear wall and said curved front wall join, said curved front wall comprises at least one aperture having a longitudinal channel extending from said bottom edge towards said top edge without reaching said top edge and defined by edges, said rear wall having adhesive means and a first removable cover to prevent unwanted matter from sticking to said adhesive means of said rear wall, said bracket is mounted onto a surface with said adhesive means of said rear wall;
B) a suspending flat tab assembly comprising a generally elongated torso having a first flat tab at a first distal end, said first flat tab shaped to snugly fit within said at least one aperture, said torso has a second flat tab at a second distal end, said second flat tab has said adhesive means, said second flat tab further comprises a second removable cover to prevent said unwanted matter from sticking to said adhesive means of said second flat tab, said second flat tab is secured onto an object to be suspended; and C) suspending means to suspend said suspending flat tab assembly from said bracket comprising aligning and passing said first flat tab through said at least one aperture and allowing said first flat tab to rest upon said interior seam at said bottom edge vertically below said interior seam, and further characterized in that said suspending tab flat assembly rests parallel to said rear wall.

2. The bracket assembly to suspend objects according to claim 1, further characterized in that said surface is a wall structure, furniture panels, or inside kitchen cabinet doors.

3. The bracket assembly to suspend objects according to claim 2, further characterized in that said torso is only slightly narrower than said longitudinal channel.

* * * * *